US008315219B2

(12) United States Patent
Kim et al.

(10) Patent No.: US 8,315,219 B2
(45) Date of Patent: Nov. 20, 2012

(54) METHOD FOR SUPPORTING MOBILITY OF A MOBILE NODE IN A MULTI-HOP IP NETWORK AND A NETWORK SYSTEM THEREFOR

(75) Inventors: Jin-Hyoung Kim, Hwaseong-si (KR); Sun-Gi Kim, Seoul (KR); Dae-Hyung Kwon, Seoul (KR); Choong-Seon Hong, Yongin-si (KR); Jin-Ho Kim, Goyang-si (KR); Byung-Goo Choi, Seoul (KR); Jihyuk Hgo, Wonju-si (KR)

(73) Assignees: Samsung Electronics Co., Ltd (KR); University-Industry Cooperation Group of Kyung Hee University (KR)

( * ) Notice: Subject to any disclaimer, the term of this patent is extended or adjusted under 35 U.S.C. 154(b) by 377 days.

(21) Appl. No.: 12/702,793

(22) Filed: Feb. 9, 2010

(65) Prior Publication Data

US 2010/0202357 A1    Aug. 12, 2010

(30) Foreign Application Priority Data

Feb. 9, 2009    (KR) .................. 10-2009-0010225

(51) Int. Cl.
*H04W 4/00*    (2009.01)
(52) U.S. Cl. .................. 370/329; 370/338; 370/341

(58) Field of Classification Search ................ None
See application file for complete search history.

(56) References Cited

U.S. PATENT DOCUMENTS

| | | | |
|---|---|---|---|
| 2006/0291426 A1* | 12/2006 | Park et al. .................. 370/331 |
| 2007/0133359 A1* | 6/2007 | Mijiritskii et al. ............. 369/14 |
| 2008/0207206 A1* | 8/2008 | Taniuchi et al. .............. 455/436 |
| 2009/0022126 A1* | 1/2009 | Damle et al. .................. 370/338 |
| 2009/0313680 A1* | 12/2009 | Hirano ............................. 726/3 |
| 2011/0013566 A1* | 1/2011 | Aso et al. ...................... 370/328 |
| 2011/0170531 A1* | 7/2011 | Ng et al. ....................... 370/338 |
| 2011/0246629 A1* | 10/2011 | Savolainen et al. ........... 709/220 |

* cited by examiner

*Primary Examiner* — Chi Pham
*Assistant Examiner* — Soon-Dong D Hyun
(74) *Attorney, Agent, or Firm* — The Farrell Law Firm, P.C.

(57) ABSTRACT

A method is provided for supporting mobility of a Mobile Node (MN) in a multi-hop Internet Protocol (IP) network, in which an MN that has moved from a source Personal Area Network (PAN) to a target PAN, sends a Router Solicitation (RS) message with an option for requesting its profile to a gateway of the target PAN, and receives a Router Advertisement (RA) message from the gateway in response to the RS message. The RA message includes a home prefix of the MN as the requested profile. The method supports mobility of MNs, enables unicast communication, and facilitates efficient use of the network.

10 Claims, 13 Drawing Sheets

| 0 | 7 | 15 | 23 | 31 |
|---|---|---|---|---|
| Type | | Length | 16 bits Care-of Address | |

FIG.12

METHOD FOR SUPPORTING MOBILITY OF A MOBILE NODE IN A MULTI-HOP IP NETWORK AND A NETWORK SYSTEM THEREFOR

PRIORITY

This application claims priority under 35 U.S.C. §119(a) to a Korean Patent Application filed in the Korean Intellectual Property Office on Feb. 9, 2009 and assigned Serial No. 10-2009-0010225, the entire disclosure of which is herein incorporated by reference.

BACKGROUND OF THE INVENTION

1. Field of the Invention

The present invention relates to Internet Protocol (IP) network communication, and more particularly, to a method for using neighbor discovery messages to support mobility of Mobile Nodes (MNs) in a multi-hop wireless network and a network system therefor.

2. Description of the Related Art

Generally, nodes in an IP wireless network include a device such as a wireless sensor, which is required to physically connect with the actual application environments. For example, a wireless sensor for Personal Area Networks (PANs) is based on the IEEE 802.15.4 standard.

FIG. 1 illustrates the entire frame format for an IEEE 802.15.4 frame, the maximum size of which is 127 bytes and in which an Internet Protocol version 6 (IPv6) over Low power Wireless Personal Area Network (6LoWPAN) packet is included. 6LoWPAN refers to a simple low-cost communication network that provides a wireless connection environment to applications that require limited power and low throughput. The 6LoWPAN standard defines three types of headers: a dispatch header, a mesh header, and a fragmentation header.

The dispatch header is a header representing information about its succeeding headers. For example, Header Compression (HC) dispatch headers indicate compression information of an IP header or a User Datagram Protocol (UDP) header. That is, the IP header is maximally compressed by an HC1 dispatch header, and the UDP header is maximally compressed by an HC2 dispatch header. The mesh header is a header indicating information for mesh routing. The fragmentation header is a header indicating information for fragmentation and reassembly of the packet.

FIGS. 2A and 2B illustrate an operational difference between Mobile IPv6 technology and Proxy Mobile IPv6 technology.

FIG. 2A illustrates mobility management in Mobile IPv6. A mobile terminal (or an MN), in which inter-PAN mobility has occurred, performs binding update by directly communicating with a Home Agent (HA). In Mobile IPv6, the MN should have all mobility protocols necessary for communication since it plays an important role in mobility management.

FIG. 2B illustrates mobility management in Proxy Mobile IPv6. In Proxy Mobile IPv6, unlike in Mobile IPv6 of FIG. 2A, an MN does not take part in IP mobility protocol signaling. When the MN moves, an Access Router (AR) performs binding update by communicating with an HA. That is, in Proxy Mobile IPv6, mobility is managed from the viewpoint of the network.

In the conventional Mobile IPv6 scheme, only the MN with a complex option can receive an Internet service while on the move. However, in Proxy Mobile IPv6, even IPv6 nodes with no mobility protocol may receive the Internet service while on the move.

FIG. 3 illustrates a scenario in which an MN equipped with a mobility protocol directly manages mobility when a Mobile IPv6 protocol is applied.

In the Mobile IPv6 environment, an MN should perform binding update by directly communicating with an HA. Therefore, compared with when Proxy Mobile IPv6 is applied, the function the MN should implement is comparatively complex, and the MN must handle excessive signaling. Consequently, it is inappropriate to apply a mobility protocol such as Mobile IPv6 in order to support mobility of MNs for a network (e.g., IEEE 802.15.4-based 6LoWPAN) that has the limitations of low power, narrow bandwidth, small memory space, limited processing capability, etc.

SUMMARY OF THE INVENTION

An aspect of the present invention is to address at least the above-mentioned problems and/or disadvantages and to provide at least the advantages described below. Accordingly, an aspect of the present invention is to support mobility by applying a Proxy Mobile IPv6 protocol to Mobile Nodes (MNs) in an Internet Protocol (IP) network.

Another aspect of the present invention is to enable PAN attachment detection of an MN by using a Router Solicitation (RS) message and a Router Advertisement (RA) message of a neighbor discovery protocol in order to apply a conventional single-hop Proxy Mobile IPv6 technology to an IPv6 over Low power Wireless Personal Area Network (6LoWPAN) network based on a multi-hop environment.

Another aspect of the present invention is to exchange neighbor discovery messages with a gateway on a unicast basis by designating a mesh header value of a 6LoWPAN packet.

Another aspect of the present invention is to enable neighbor discovery messages to be sent to a gateway in a multi-hop network by designating a MAC header value of a 6LoWPAN packet.

According to one aspect of the present invention, a method is provided for supporting mobility of a Mobile Node (MN) in a multi-hop Internet Protocol (IP) network, in which an MN that has moved from a source Personal Area Network (PAN) to a target PAN, sends a Router Solicitation (RS) message with an option for requesting its profile to a gateway of the target PAN, and the MN receives a Router Advertisement (RA) message from the gateway in response to the RS message, wherein the RA message includes a home prefix of the MN as the requested profile.

According to another aspect of the present invention, a multi-hop Internet Protocol (IP) network system is provided, in which a Mobile Node (MN) sends a Router Solicitation (RS) message, and a gateway sends a Router Advertisement (RA) message to the MN in response to the RS message, wherein the RS message includes an option for requesting a profile of the MN, and the RA message includes a home prefix of the MN as the requested profile.

BRIEF DESCRIPTION OF THE DRAWINGS

The above and other aspects, features and advantages of certain embodiments of the present invention will be more apparent from the following description taken in conjunction with the accompanying drawings, in which:

FIG. 12 illustrates a format of a 16-bit address option included in an RA message when it is applied to a 6LoWPAN.

Throughout the drawings, the same drawing reference numerals will be understood to refer to the same elements, features and structures.

DETAILED DESCRIPTION OF EMBODIMENTS OF THE INVENTION

The terms and words used in the following description and claims are not limited to the dictionary meanings, but are merely used to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

A method for supporting mobility of MNs in a network to which Proxy Mobile IPv6 is applied according to an embodiment of the present invention will now be described in detail with reference to the accompanying drawings.

MNs need a mobility support technology for IP sensor nodes, which optimizes and simplifies the protocol by removing or minimizing mobility-related signaling.

Figure 1:
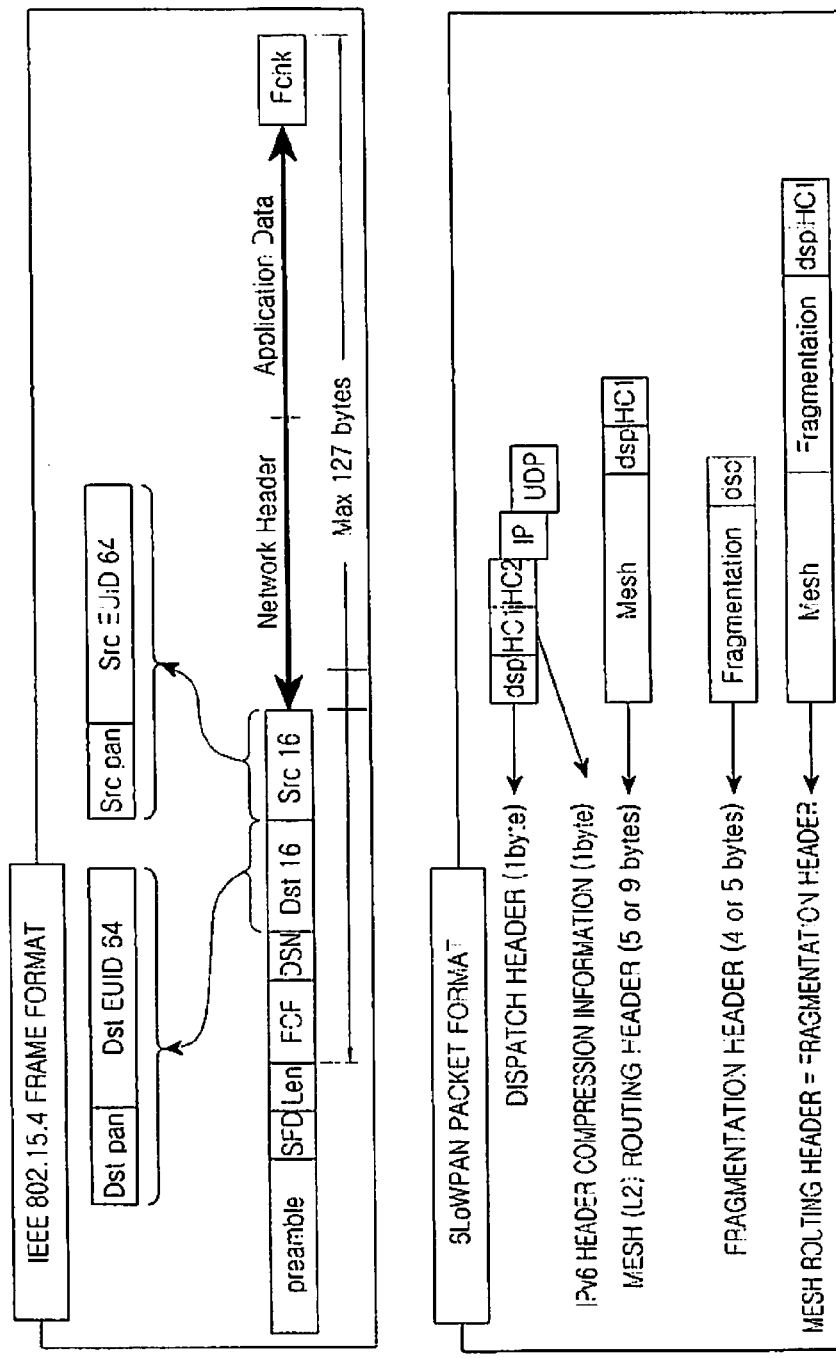
FIG. 1 illustrates a format of an IEEE 802.15.4 frame with a 6LoWPAN packet.
Figure 2A:
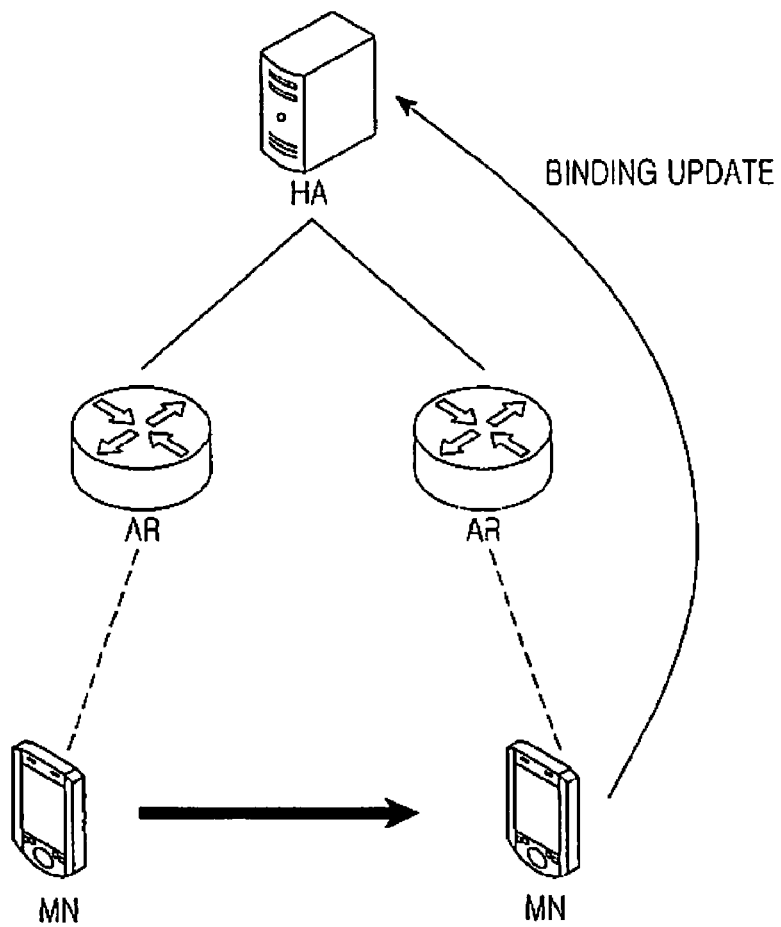
FIG. 2A illustrates mobility management in Mobile IPv6.
Figure 2B:
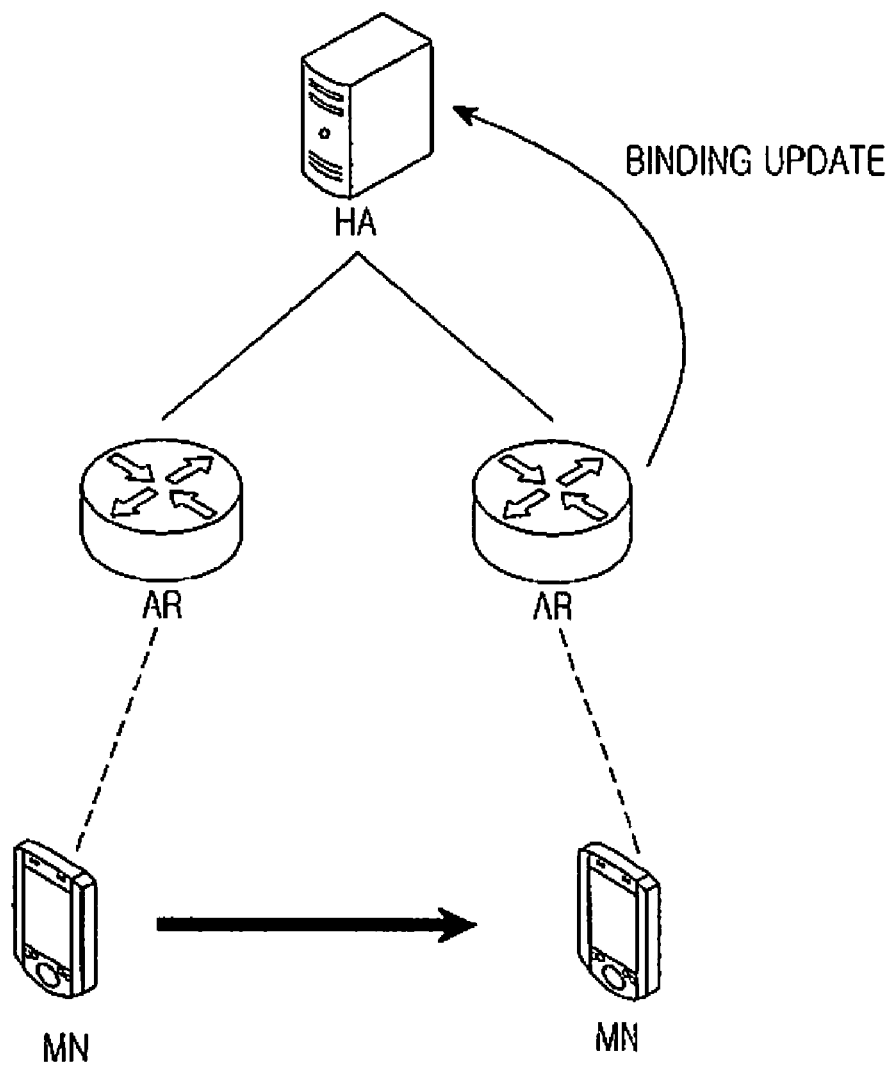
FIG. 2B illustrates mobility management in Proxy Mobile IPv6.
Figure 3:
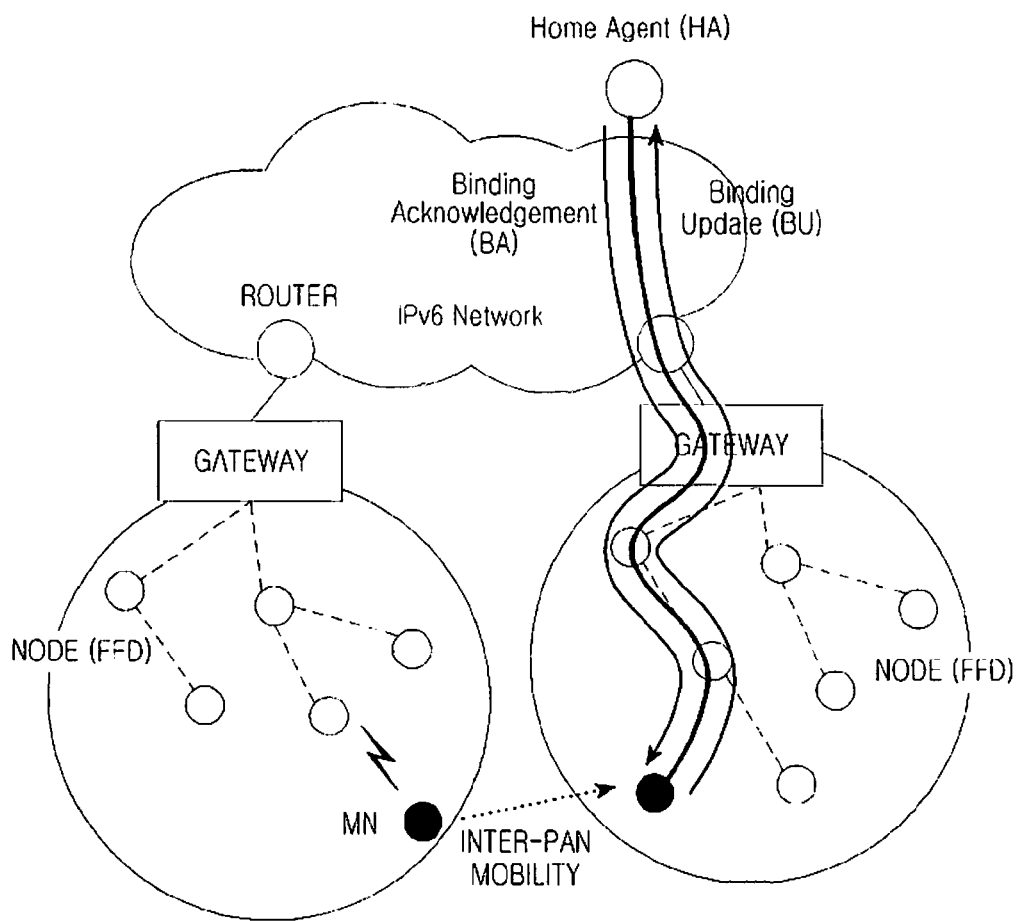
FIG. 3 illustrates a scenario in which an MN directly manages mobility when a Mobile IPv6 protocol is applied.
Figure 4:
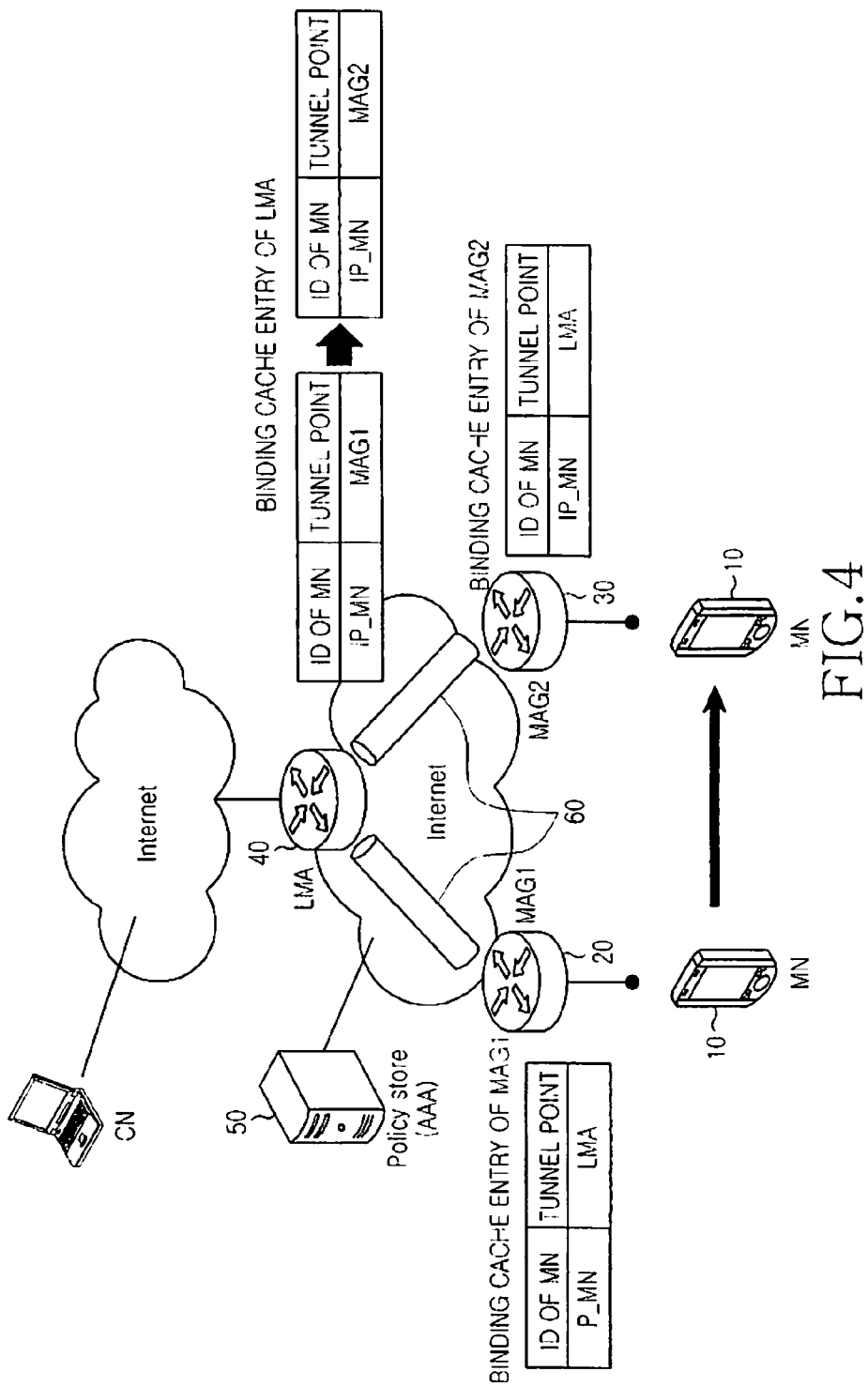
FIG. 4 illustrates an operation of a Proxy Mobile IPv6 protocol.

FIG. 4 illustrates an operation of a Proxy Mobile IPv6 protocol.

When an MN 10 moves from a first Mobile Access Gateway (MAG1) 20 to a second MAG (MAG2) 30 in an access network (i.e., when inter-PAN mobility occurs), the MAG2 30 (i.e., MAG of a target PAN) acquires a home prefix, which is network identification information, and address information of a Local Mobility Anchor (LMA) 40, as profile information of the MN 10, from an Authentication, Authorization and Accounting (AAA) server 50.

The MAG2 30 periodically sends a Router Advertisement (RA) message with a home prefix of the MN 10 so that the MN 10 may not recognize that it has attached to another network.

The MAG2 30 sends a Proxy Binding Update (PBU) message to the LMA 40 in order to register a home address of the MN 10 and an address of the MAG2 30 in the LMA 40.

Upon receipt of the PBU message, the LMA 40 stores in a binding cache entry the address of the MN 10 and the address of the MAG2 30 which is a source address of the PBU message. The LMA 40 establishes a bidirectional tunnel 60 for data communication, between the LMA 40 and the MAG2 30, and then sends a Proxy Binding Acknowledgement (PBA) message to the MAG2 30.

Hence, in the Proxy Mobile IPv6 environment, even thought the MN 10 does not perform the mobility-related function (i.e., mobility protocol signaling), the mobility is guaranteed if the MAG2 30 performs the binding process between the MAG2 30 and the LMA 40. Meanwhile, by applying Proxy Mobile IPv6 to a low-power, low-capacity network such as 6LoWPAN, it is possible to more effectively manage the network because MNs do not need to directly carry out mobility-related signaling.

Figure 5:
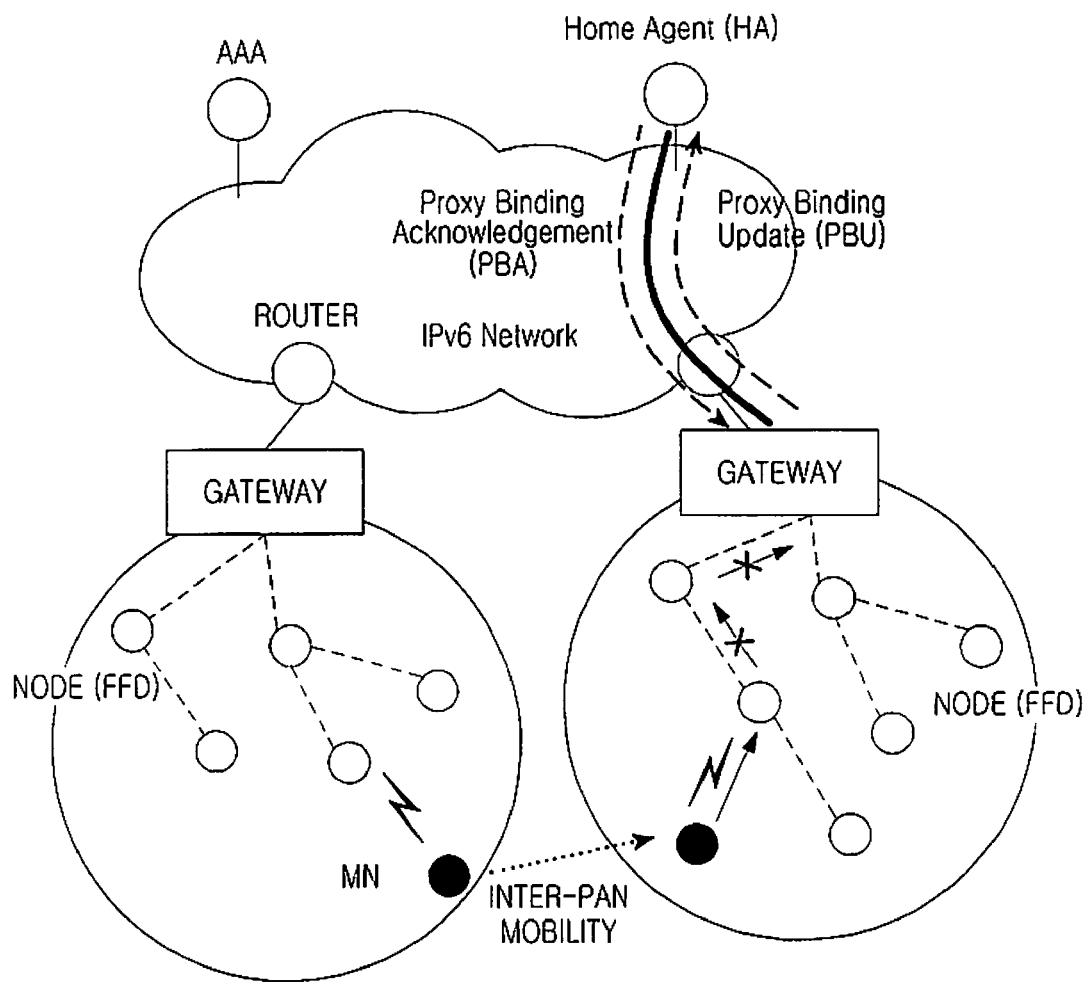
FIG. 5 illustrates a scenario in which a gateway handles mobility-related signaling in a wireless PAN to which a Proxy Mobile IPv6 protocol is applied.

FIG. 5 illustrates a scenario in which a gateway handles mobility-related signaling on behalf of an MN in a wireless PAN to which a Proxy Mobile IPv6 protocol is applied.

The above-described Proxy Mobile IPv6 protocol is a mobility support protocol considering single-hop network environments. However, the actual wireless network environments are realized as multi-hop environments that include a plurality of relay nodes.

Therefore, if the conventional Proxy Mobile IPv6 protocol considering single-hop network environments is applied to multi-hop environments, a neighbor discovery message sent by an MN cannot be directly forwarded to the gateway due to nodes between the gateway and the MN as shown in FIG. 5. Thus, the gateway may not directly detect PAN entry of the MN. As a result, in multi-hop network environments, the mobility of MNs cannot be supported despite application of the conventional Proxy Mobile IPv6 protocol.

Accordingly, the present invention provides a method for applying Proxy Mobile IPv6 in the multi-hop IP network environments.

Figure 6:
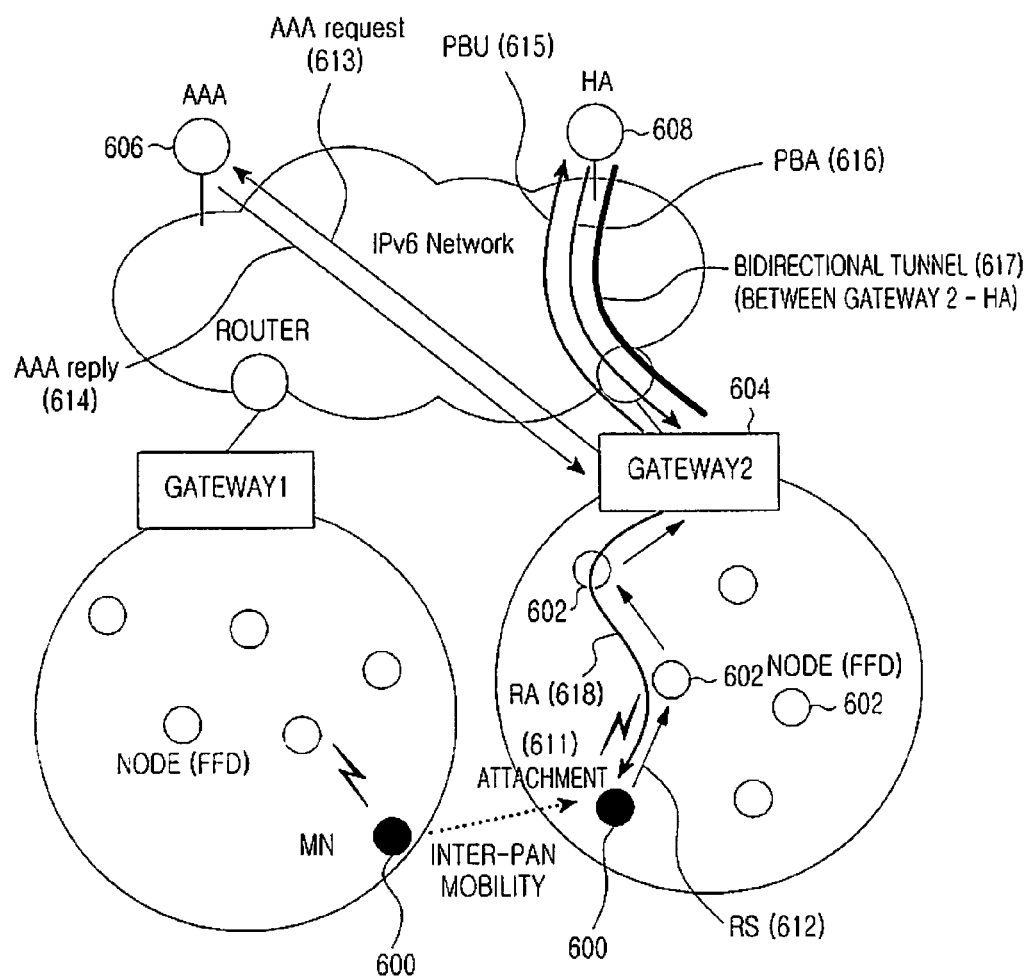
FIG. 6 illustrates a message exchange scenario for supporting mobility of an MN after the MN has moved to a new PAN according to an embodiment of the present invention.

FIG. 6 illustrates a detailed message exchange scenario for supporting mobility of an MN after the MN has moved to a new PAN (after inter-PAN mobility has occurred) according to an embodiment of the present invention.

Movement Notification of MNs has been defined to support mobility of MNs so that the conventional single-hop Proxy Mobile IPv6 protocol may be applied to multi-hop networks. The Movement Notification of MNs is a PAN Attachment Detection mechanism of MNs, which has modified the neighbor discovery protocol according to multi-hop mobility environments. Exchange of AAA Request and AAA Reply messages and exchange of PBU and PBA messages are basically the same as in the conventional Proxy Mobile IPv6 operation. Therefore, a description of details which are not related to the substance of the present invention will be omitted.

During attachment of an MN, a process for processing mobility-related signaling in a PAN is minimized by using only a Router Solicitation (RS) message and a Router Advertisement (RA) message. The RS message and the RA message are exchanged through Layer 2 (L2) routing.

Figure 7:
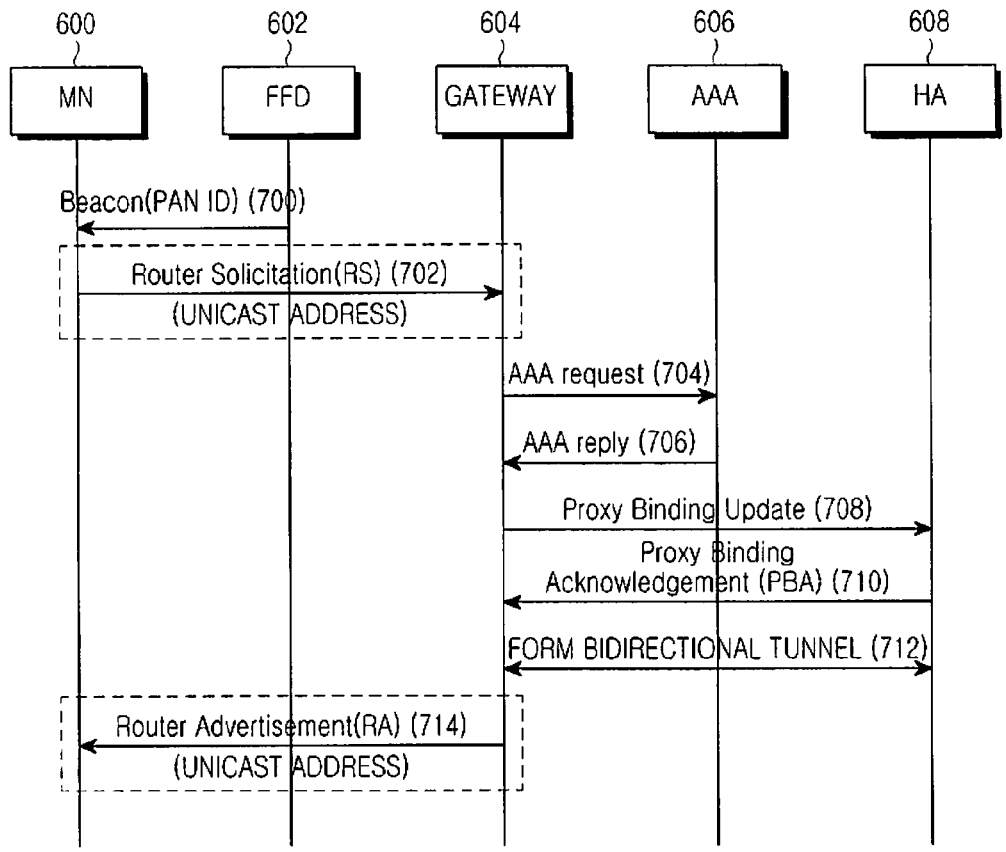
FIG. 7 is a flow diagram of message exchange.

FIG. 7 illustrates the entire flow of message exchange.

An operation of the present invention based on FIG. 7 will be described with reference to FIG. 6.

An AAA server 606 stores profile information of a 6LoWPAN sensor node (or MN) 600. The profile information of the MN 600 may include a home address, a home prefix, etc.

The MN 600 detects its movement to a new PAN based on PAN ID information in a beacon signal 700. If the PAN ID in the current beacon signal is different from the old PAN ID, the MN 600 determines that it has attached to the new PAN (see 611).

When the MN 600 attaches to a target PAN, it sends an RS message 702 to the target PAN's gateway 604 on a unicast basis through Full Function Devices (FFDs) 602, which are relay nodes adjacent to the gateway 604 (see 612). An RS packet for the RS message is not broadcasted, and includes an MN_ID option. The MN_ID option is an option that is included in the RS packet and used to request a profile of the 6LoWPAN sensor node.

Upon receipt of the RS message 702, the gateway 604 sends a request message for the profile of the MN 600, i.e., an AAA Request message 704, to the AAA server 606 using the MN_ID option in the RS message 702 (see 613). The gateway 604 finds out a 64-bit Medium Access Control (MAC) address of the MN 600 and a link-local address of an IP header's source address part from a MAC header of the RS packet transmitted by the MN 600.

Upon receipt of the AAA Request message 704 from the gateway 604, the AAA server 606 sends a response message, i.e., an AAA Reply message 706, to the gateway 604 along with profile information of the MN 600 (see 614).

The gateway 604 may find out an address of an LMA, or HA, and home prefix information from the AAA Reply message 706 based on the profile information of the MN 600, and sends a PBU message 708 to an HA 608 of the MN 600 on behalf of the MN 600 (see 615).

Upon receipt of the PBU message 708 from the gateway 604, the HA 608 sets a bidirectional tunnel point for data communication as an address of the gateway 604, and sends a PBA message 710 to the gateway 604 (see 616).

Then, a bidirectional tunnel is established between the HA 608 and the gateway 604 (see 617 and 712).

The gateway 604 assigns a unique 16-bit address of the current PAN to the MN 600, and stores the address of the MN 600. That is to say, the gateway 604 stores and manages information about all nodes in the PAN managed by the gateway 604.

The gateway 604 sends an RA message 714 to the MN 600 on a unicast basis (see 618), the RA message 714 including the home prefix which is network identification information of the MN 600, and the assigned 16-bit address option. Upon receipt of the RA message 714, the MN 600 may find out the address of the gateway 604. Because the MN 600 has received its home prefix, the MN 600 may misjudge that it is still in the home link. Thus, the mobility is actually supported through the Proxy Mobile IPv6 protocol of the gateway 604.

Figure 8:
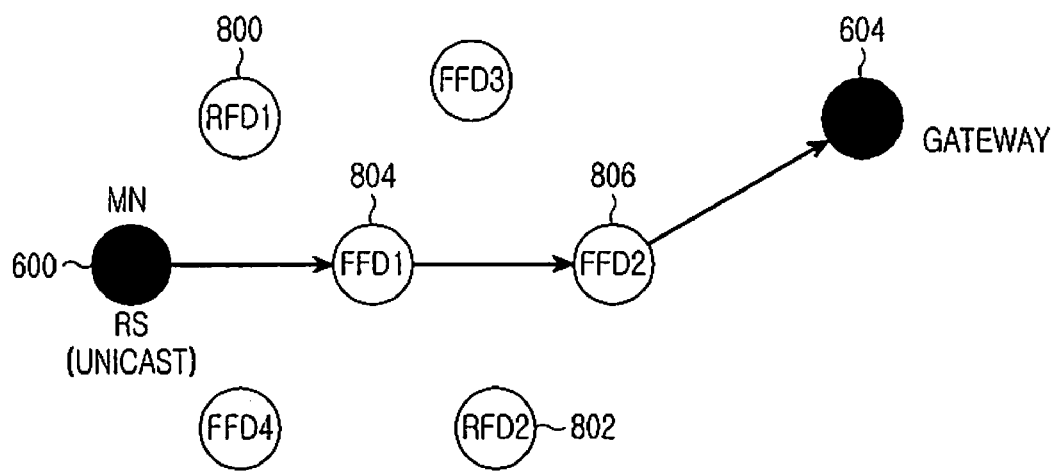
FIG. 8 illustrates a scenario in which an MN sends an RS message to a gateway on a unicast basis.

FIG. 8 illustrates a scenario in which an MN sends an RS message to a gateway on a unicast basis.

An RS message sent by the MN 600 is delivered to the gateway 604 on a unicast basis through a first Full Function Device (FFD1) 804 and a second FFD (FFD2) 806, which are relay nodes adjacent to the gateway 604. A third Full Function Device (FFD3), a fourth Full Function Device (FFD4), a first Reduced Function Device (RFD1) and a second Reduced Function Device (RFD2) managed by the gateway 604 do not function as relay nodes for the RS message.

In accordance with an embodiment of the present invention, as a method for supporting mobility of MNs, it is possible to apply the Proxy Mobile IPv6 protocol, which is a network based mobility technology, to the 6LoWPAN network.

If the Proxy Mobile IPv6 technology is applied to the 6LoWPAN environments, even though MNs do not include the mobility protocol, the mobility may be supported seamlessly while the MNs are moving between different PANs since the gateway handles the mobility-related signaling.

Figure 9:
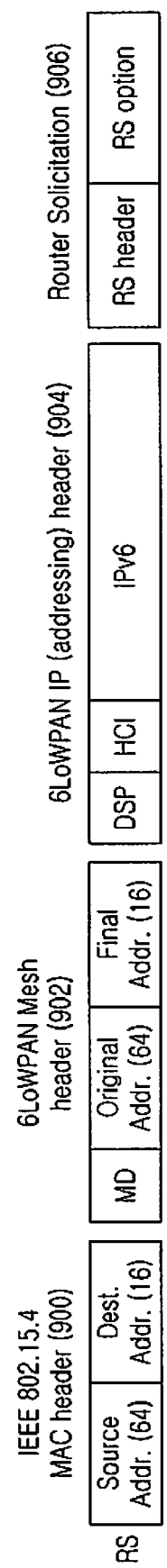
FIG. 9 illustrates a format of an RS packet transmitted by an MN when it is applied to a 6LoWPAN.

FIG. 9 illustrates the entire format of an RS packet transmitted by an MN when it is applied to a 6LoWPAN.

A source address of an IEEE 802.15.4 MAC header 900 is set as a 64-bit MAC address of a 6LoWPAN MN, and a destination address is set as a 16-bit MAC address of an adjacent node FFD1. Therefore, an RS packet transmitted by the MN is delivered to the gateway through the adjacent node. An address of the adjacent node FFD1 can be determined from a beacon signal.

The RS packet includes a 6LoWPAN Mesh Header 902 for L2 routing. An original address flag of the mesh header 902 is set with 64 bits, and a final address flag is set with 16 bits. The original address is set the same as the 64-bit MAC address of the MN. The final address is set as a 16-bit address of the gateway. Optionally, the 16-bit address of the gateway may be always set as 0x0001. Therefore, the RS packet may be delivered to the gateway on a unicast basis.

Further, the RS packet includes a 6LoWPAN IP addressing header 904.

The 6LoWPAN IP addressing header 904 includes a Dispatch (DSP) header to indicate the presence of a compressed IPv6 header.

An HC1 header of the 6LoWPAN IP addressing header 904 includes a link-local address in a source address of an IP header by setting a source prefix as Compressed, a source Interlace ID (IID) as Uncompressed, and a destination prefix and a destination IID as Compressed. Next header is set as Internet Control Message Protocol (ICMP) to indicate that the packet is an RS packet. The source prefix and the destination prefix may be compressed to FE80::/64.

The source IID of an IPv6 header included in the 6LoWPAN IP addressing header 904 includes an IID address of an MN since it is not compressed.

An RS packet 906 includes an RS header after the IPv6 header, and also includes in an RS option an MN_ID option requiring profile information of the MN.

Table 1 shows actual data values for the RS message format of FIG. 9.

TABLE 1

| Header | Field | Data | Size |
| --- | --- | --- | --- |
| IEEE 802.15.4 MAC Header | Source Address | 64-bit MAC Address of 6LoWPAN sensor node | 8 bytes |
| | Destination Address | 16-bit MAC Address of FFD1 | 2 bytes |
| 6LoWPAN Mesh Header | MD (Mesh Dispatch) | Original Address Flag = 64 bits<br>Final address flag = 16 bits<br>Hop left | 1 byte |
| | Original Address | 64-bit Address of 6LoWPAN sensor node | 8 bytes |
| | Final Address | 0x0001 (16-bit address of 6LoWPAN gateway) | 2 bytes |
| 6LoWPAN IP (addressing header) | DSP (Dispatch) | Compressed IPv6 | 1 byte |
| | HC1 (IPv6 Header Compression) | Source Prefix: Compressed<br>Source IID: Uncompressed<br>Destination Prefix: Compressed<br>Destination IID: Compressed<br>Next Header = ICMP | 1 byte |

TABLE 1-continued

| Header | Field | Data | Size |
|---|---|---|---|
| | IPv6 Header | Source Address: link-local address (64 bits) of 6LoWPAN sensor node<br>Hop Limit (8 bits) | 9 bytes |
| Router Solicitation | RS Header | Router Solicitation Header | 4 bytes |
| | RS Option | MN_ID (profile option of 6LoWPAN sensor node) | 8 bytes |

Since the RS message is sent from the MN to the gateway, there is a function, i.e., MN's attachment function, indicating that the MN is attached to the PAN, and gateway discovery by the MN is possible.

The unicast communication becomes possible by setting the final address of the RS packet as a gateway address and setting the 16-bit address of every gateway as 0x0001. That is, because of nonuse of broadcast communication, the total number of signaling messages in the PAN is reduced.

Further, the destination address of the MAC header of the RS packet is designated as an address of an adjacent node, indicating PAN attachment of the MN up to the gateway through the adjacent node in the multi-hop environments.

As the MN_ID option indicating profile information of the MN is used in the RS option of the RS packet, the gateway may acquire the MAC address, link-local address and MN_ID information of the moved MN merely by receiving the RS message.

Figure 10:
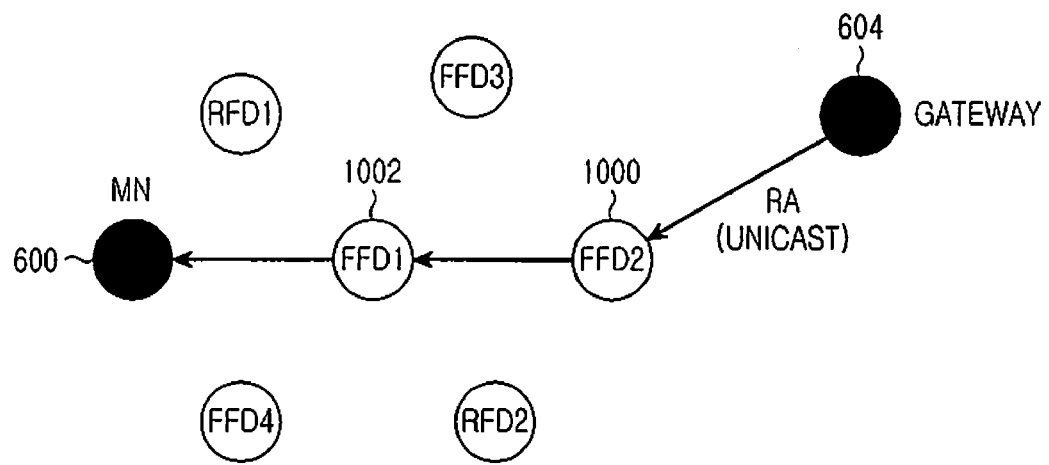
FIG. 10 illustrates a scenario in which a gateway sends an RA message to an MN on a unicast basis.

FIG. 10 illustrates a scenario in which a gateway sends an RA message to an MN on a unicast basis.

A gateway 604 sends an RA message to an MN 600 on a unicast basis in response to an RS packet received from the MN 600. Before sending the RA message, the gateway 604 acquires a route of the MN 600 by implementing a routing protocol since it has no routing information of the MN 600. Since the address of the MN 600 is already known through the RS packet, the route is established through a Route Request (RREQ) message and a Route Reply (RREP) message.

The RA message sent by the gateway 604 is delivered to the MN 600 on a unicast basis through a node FFD2 1000 and a node FFD1 1002 that are adjacent to the MN 600.

Figure 11:
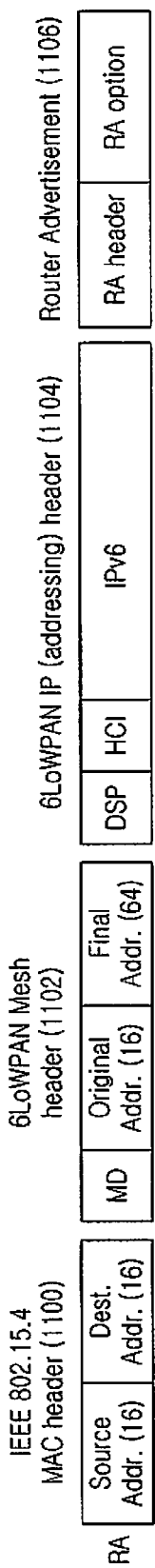
FIG. 11 illustrates a format of an RA packet transmitted by a gateway when it is applied to a 6LoWPAN.

FIG. 11 shows the entire format of an RA packet for an RA message that is transmitted by a gateway when it is applied to a 6LoWPAN.

A source address of an IEEE 802.15.4 MAC header 1100 is set as a 16-bit MAC address of the gateway, and a destination address is set as a 16-bit MAC address of an adjacent node FFD2. Therefore, the RA packet transmitted by the gateway is delivered to the MN via the adjacent node.

Like the RS packet, the RA packet includes a 6LoWPAN mesh header 1102 for L2 routing of the RA packet. An original address flag of the mesh header 1102 is set with 16 bits, and a final address flag is set with 64 bits. An original address is set as a 16-bit MAC address of the gateway, and a final address is set as a 64-bit MAC address of the MN that was stored when the RS packet was received. Therefore, the RA packet can be delivered to the MN on a unicast basis.

The RA packet further includes a 6LoWPAN IP addressing header 1104.

The 6LoWPAN IP addressing header 1104 includes a DSP header to indicate the presence of a compressed IPv6 header.

An HC1 header of the 6LoWPAN IP addressing header 1104 sets a source prefix and a destination prefix as Compressed, because the prefixes are equally set to FE80::/64 as link-local addresses. Link-local addresses are included in source and destination addresses of an IP header by setting a source IID and a destination IID as Uncompressed. A next header is set as ICMP to indicate that the packet is an RA packet.

Since the source IID of the IPv6 header included in the 6LoWPAN IP addressing header 1104 was not compressed, it includes an IID address of the gateway. The destination IID is set as a link-local address of the MN.

In addition, the RA packet includes an RA header 1106 after the IPv6 header, and also includes in an RA option a home prefix option of the MN and a 16-bit address option of a 6LoWPAN node.

FIG. 12 illustrates a format of a 16-bit address option to be included in an RA message when it is applied to a 6LoWPAN.

Table 2 shows actual data values for the RA message format of FIG. 11.

TABLE 2

| Header | Field | Data | Size |
|---|---|---|---|
| IEEE 802.15.4 MAC Header | Source Address | 16-bit MAC Address of 6LoWPAN gateway | 2 bytes |
| | Destination Address | 16-bit MAC Address of FFD2 | 2 bytes |
| 6LoWPAN Mesh Header | MD (Mesh Dispatch) | Original Address Flag = 16 bits<br>Final address flag = 64 bits<br>Hop left | 1 byte |
| | Original Address | 16-bit Address of 6LoWPAN gateway | 2 bytes |
| | Final Address | 64-bit address of 6LoWPAN sensor node | 8 bytes |
| 6LoWPAN IP (Addressing Header) | DSP(Dispatch) | Compressed IPv6 | 1 byte |
| | HC1(IPv6 Header Compression) | Source Prefix: Compressed<br>Source IID: Uncompressed<br>Destination Prefix: Compressed<br>Destination IID: Uncompressed<br>Next Header = ICMP | 1 byte |
| | IPv6 Header | Source Address: link-local address (64 bits) of 6LoWPAN gateway<br>Destination Address: link-local address (64 bits) of 6LoWPAN sensor node<br>Hop Limit (8 bits) | 17 bytes |

TABLE 2-continued

| Header | Field | Data | Size |
|---|---|---|---|
| Router Advertisement | RA Header | Router Advertisement Header | 16 bytes |
| | RA Option | home prefix option (8 bytes) of 6LoWPAN sensor node<br>16-bit address option (2 bytes) of 6LoWPAN sensor node | 10 bytes |

By including a 16-bit address option of an MN in an RA message sent from a gateway to the MN, the gateway directly assigns a 16-bit address to the MN, thereby preventing collision of the 16-bit address.

Since the RA message format includes a home prefix option of the MN, an MN that receives the RA message determines that the home prefix is the same as its home prefix, thus guaranteeing mobility.

Unicast communication is possible by setting the address of an MN that is acquired from an RS message as a final address of an RA message. That is, due to nonuse of broadcast communication, the total number of signaling messages in the PAN is reduced.

In addition, as a destination address of a MAC header of an RA packet is designated as an address of an adjacent node, an RA message is sent up to an MN via the adjacent node in the multi-hop environment.

In conclusion, the gateway may store and manage information about all nodes in its PAN simply by receiving an RS message and sending an RA message, and thus may support mobility of MNs.

In the network environment to which Proxy Mobile IPv6 is applied according to the present invention, MNs do not need to perform the complex and excessive signaling for mobility, making it possible to efficiently operate the wireless PANs supporting low power and narrow bandwidth.

Further, the MN mobility support method according to the present invention enables the Proxy Mobile IPv6 technology even in multi-hop IP network environments. Therefore, MNs do not need to perform mobility-related signaling, and the mobility is supported by the gateway.

Particularly, by applying the mobility support method according to the present invention to the narrow-bandwidth 6LoWPAN environments, addressing of MNs is possible by an external node and the neighbor discovery protocol is reused by simplifying and optimizing it, thereby making it possible to minimize the process for handling mobility-related signaling messages in the PANs in the low-power, narrow-bandwidth 6LoWPAN environments.

While the invention has been shown and described with reference to a certain exemplary embodiments thereof, it will be understood by those skilled in the art that various changes in form and details may be made therein without departing from the spirit and scope of the invention as defined by the appended claims and their equivalents.

What is claimed is:

1. A method for supporting mobility of a Mobile Node (MN) in a multi-hop Internet Protocol (IP) network, comprising:
   determining, by the MN, that the MN has moved from a source Personal Area Network (PAN) to a target PAN, if a PAN identifier (ID) included in a received beacon signal is different from a previously known PAN ID;
   sending, by an MN that has moved from the source PAN to the target PAN, a Router Solicitation (RS) message with an option for requesting its profile to a gateway of the target PAN; and
   receiving, by the MN, a Router Advertisement (RA) message from the gateway in response to the RS message; wherein the RA message includes a home prefix of the MN as the requested profile and an address option that the gateway uniquely assigns to the MN.

2. The method of claim 1, further comprising:
   sending, by the gateway, an Authentication, Authorization and Accounting (AAA) request message to an AAA server using the option for requesting a profile, which is received from the MN; and
   receiving, by the gateway, an AAA reply message with a home prefix of the MN from the AAA server in response to the AAA request message.

3. The method of claim 1, wherein the multi-hop IP network is an Ipv6over Low power Wireless Personal Area Network (6LoWPAN).

4. The method of claim 1, wherein a final address included in a mesh header of the RS message is designated as an address of the gateway, and a final address included in a mesh header of the RA address is designated as an address of the MN.

5. The method of claim 1, wherein a destination address of a Medium Access Control (MAC) header of the RS message is designated as an address of an adjacent relay node, which is acquired from the beacon signal, and a destination address of a MAC header of the RA message is designated as an address of an adjacent relay node, which is acquired from one of a Route Request (RREQ) message and a Route Reply (RREP) message.

6. A multi-hop Internet Protocol (IP) network system, comprising:
   a Mobile Node (MN) for sending a Router Solicitation (RS) message; and
   a gateway for sending a Router Advertisement (RA) message to the MN in response to the RS message;
   wherein the RS message includes an option for requesting a profile of the MN, and the RA message includes a home prefix of the MN as the requested profile and an address option that the gateway uniquely assigns to the MN, and
   wherein the MN determines that the MN has moved from a source Personal Area Network (PAN) to a target PAN with the gateway, if a PAN identifier (ID) included in a received beacon signal is different from a previously known PAN ID.

7. The multi-hop IP network system of claim 6, further comprising an Authentication, Authorization and Accounting (AAA) server for sending an AAA reply message with a home prefix of the MN in response to an AAA request message sent by the gateway, wherein the AAA request message is sent using the option for requesting a profile, which is received from the MN.

8. The multi-hop IP network system of claim 6, wherein the multi-hop IP network is an Ipv6 over Low power Wireless Personal Area Network (6LoWPAN).

9. The multi-hop IP network system of claim 6, wherein a final address included in a mesh header of the RS message is designated as an address of the gateway, and a final address included in a mesh header of the RA address is designated as an address of the MN.

10. The multi-hop IP network system of claim 6, wherein a destination address of a Medium Access Control (MAC) header of the RS message is designated as an address of an adjacent relay node, which is acquired from the beacon signal, and a destination address of a MAC header of the RA message is designated as an address of an adjacent relay node, which is acquired from one of a Route Request (RREQ) message and a Route Reply (RREP) message.

* * * * *

UNITED STATES PATENT AND TRADEMARK OFFICE
CERTIFICATE OF CORRECTION

PATENT NO. : 8,315,219 B2
APPLICATION NO. : 12/702793
DATED : November 20, 2012
INVENTOR(S) : Jin-Hyoung Kim et al.

It is certified that error appears in the above-identified patent and that said Letters Patent is hereby corrected as shown below:

On the Title Page, Item (75) Inventors:

"Jihyuk HGO" should be -- Jihyuk-HEO --.

Signed and Sealed this
Eleventh Day of March, 2014

Michelle K. Lee
*Deputy Director of the United States Patent and Trademark Office*